United States Patent Office 3,359,222
Patented Dec. 19, 1967

3,359,222
THIOATED KERATIN SUBSTRATE-ETHYLENICAL-
LY UNSATURATED MONOMER GRAFT CO-
POLYMER
Robert W. Faessinger, Media, and John S. Conte, Ridley Park, Pa., assignors to Scott Paper Company, Philadelphia, Pa., a corporation of Pennsylvania
No Drawing. Original application July 6, 1966, Ser. No. 563,055. Divided and this application Dec. 7, 1966, Ser. No. 599,729
33 Claims. (Cl. 260—8)

ABSTRACT OF THE DISCLOSURE

Ethylenically unsaturated monomer peroxidic initiated graft polymerization process using as substrates thioated wool and other keratinaceous polymers, and copolymers produced by the process.

This invention relates to processes for producing a copolymer of an ethylenically unsaturated monomer with substantially water insoluble substrates as defined herein by peroxidic free radical initiated graft polymerization and to the novel copolymers produced thereby. This application is a division of application S.N. 563,055, filed July 6, 1966, as a continuation-in-part of now abandoned applications S.N. 271,491 and 271,492, filed Apr. 8, 1963; 339,324, filed Jan. 22, 1964; 345,577, filed Feb. 18, 1964; 432,816; 432,825; 432,834; 432,853; 432,855; 432,902; and 432,904, filed Feb. 15, 1965; and 491,395, filed Sept. 29, 1965.

It is an object to provide novel graft polymerization processes. Another object is to provide graft polymerization processes free from one or more of the limitations or disadvantages of prior art graft polymerization processes. It is another object to provide novel polymers. Other objects will be apparent to those skilled in the art to which this invention pertains.

According to the processes described herein a substantially water-insoluble, keratinaceous substrate as defined herein is reacted via peroxidic free radical initiated graft polymerization, with an ethylenic unsaturated monomer to produce a graft polymer.

Mino et al. U.S. Patnet 2,922,768 discloses a process for graft polymerizing various polymeric materials using a ceric ion initiated system in which a reducing agent is present. The present graft polymerizations are peroxidic initiated and utilize polymeric substrates bearing substituents as defined herein which provide the other half of the redox system.

British Patent 818,412 discloses a redox graft polymerization system in which a ferrous, chromous, manganous, etc. ion is bound to the substrate by the ion exchange capacity of the substrate. The present graft polymerizations utilize sulfur containing substrates as defined herein to provide, with the peroxidic initiator, the redox system used to effect the graft polymerization.

There are problems associated with prior art graft polymerization processes, such as the need for an inert atmosphere, need to operate at either low, high or specific temperatures, use of expensive metal catalysts, use of dangerous radioactive materials (often leading to substrate degradation), need for non-aqueous system, need for concentrated reaction systems, etc. Oxidative processes using ozone or oxygen, like high-energy radiation, lead to serious strength losses of the substarte. Ceric ion-initiated chemical reactions produce excessive amounts of vinyl homopolymer. The present graft polymerizations are free from one or more of the aforesaid limitations and disadvantages. Moreover, the graft polymerizations have many advantages not possessed by other types of graft polymerizations.

The graft polymerizations described herein are novel in that both the substrate and monomer participating in the copolymerization may be of diverse nature. The substrate may be used in any of its conventional forms. The co-polymerization may be accomplished as a batch process or as a continuous treatment process. Through the proper practice of each invention, strength losses can be avoided and a highly efficient addition of the monomer or monomers to the substrate is accomplished. The properties of the substrate can be modified in virtually any manner desired by the choice of monomer or combination of monomers and the amount thereof grafted to the substrate.

The present graft polymerizations can be carried out in dilute aqueous solutions of monomer or monomers, as well as concentrated solutions of monomer or monomers. Also, each may be conducted in either dilute or concentrated suspensions of the substrate.

An inert atmosphere is not essential, but may be used if desired. A very surprising aspect of the polymerizations is monomer solution need not be entirely free from polymerization inhibitors.

Extremes of temperature are not ordinarily necessary as the co-polymerization will proceed at ambient temperatures.

PEROXIDIC INITIATOR

The graft polymerizations described herein utilize a peroxidic initiator as part of the redox system. By redox system is meant the well known systems of the type described in D'Alelio, Gaetano F., Fundamental Principles of Polymerization, John Wiley and Sons, New York, 1952. Such peroxidic initiators include hydrogen peroxide, persulfates such as ammonium, sodium or potassium persulfate, hydroperoxides such as t-butyl hydroperoxide, diisopropylbenzene hydroperoxide, c u m e n e hydroperoxide, 1 - phenylethylhydroperoxide, etc., diacylperoxides such as benzoyl peroxide, acetyl peroxide and the like, di-alkyl peroxides such as di-t-butyl peroxide, dicumyl peroxide, etc.; peresters such as t-butyl peroxyacetate, t-butyl peroxybenzoate and the like; peracids such as performic acid, peracetic acid, perbenzoic acid, peroxylactic acid and the like; and others such as dialkyl peroxydicarbonates. These peroxy compounds must be capable of initiating a free-radical polymerization by themselves or in the presence of an activator, such as a reducing agent. The preferred group of peroxidic free-radical initiators are those that are water-soluble when the copolymerization is conducted in an aqueous medium.

As would be expected, the peroxidic initiator should be uniformly distributed throughout the monomer solution.

MONOMERS

The monomers which can be co-reacted with the substrate in the manner described herein to yield new graft polymers are those ethylenically unsaturated compounds which readily homopolymerize or readily copolymerize with other ethylenically unsaturated compounds either in bulk, or in an aqueous solution, or as an emulsion, when exposed to a redox system capable of initiating a polymerization or copolymerization. By the term monomer is meant an ethylenically unsaturated compound having the structure $>C=C<$ which encompasses vinylene monomers of the general form $CHR=CHR$ and vinylidene monomers of the general form $H_2C=CR_2$ and including the monomers on which all four of the open valence bonds are occupied by R substituents as well as those in which at least two R substituents, one on each carbon atom, form a ring derivative.

The radical R is selected from at least one member of the electron-accepting groups and electron-donating groups consisting of:

(1) Hydrogen.

(2) Alkyl, alkene and alkyne, the substituted as well as the unsubstituted in which the hydrocarbon moiety contains less than six carbon atoms such as methyl, ethyl, butyl, amyl, hexyl, ethenyl, hydroxymethyl, chloromethyl, etc.

(3) Aryl and substituted aryl such as phenyl, alpha-chlorotolyl, tolyl, 4-chlorophenyl, alpha-tolyl, xylyl, 2-bromo-4 ethylphenyl, etc.

(4) The electronegative groups, e.g., chloro, bromo, cyano, carboxy, carbalkoxy, acyloxyl, alkenyl, and the like.

(5) Alicyclic and heterocyclic, substituted and unsubstituted, such as pyridyl, thienyl, furyl, pyrrolidyl, etc.

(6) Groups of the general formula

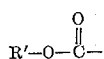

wherein R' is selected from the group consisting of hydrogen, R, and substituted as well as the unsubstituted hydrocarbons containing from 1 to 18 carbon atoms, such as methyl, ethyl, butyl, amyl, hexyl, heptyl, octadecyl, nitroethyl, nitrobutyl, N,N-dimethylaminoethyl, t-butylaminoethyl, 2-cyanoethyl, cyclohexyl, N,N-diethylaminoethyl, hydroxyethyl, hydroxypropyl and the like.

(7) Groups of the general formula

(8) Groups of the general formula

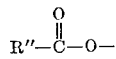

(9) Groups of the general formula

(10) Groups of the general formula

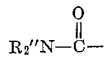

wherein R'' is selected from at least one member of the group consisting of hydrogen, R or R', aliphatic groups of from 1 to 18 carbon atoms and in addition the substituted as well as the unsubstituted hydrocarbons containing from 1 to 18 carbon atoms such as the methyl, ethyl, propyl, butyl, amyl, hexyl, heptyl, octadecyl, chloroethyl, chloromethyl, hydroxyethyl, hydroxypropyl epoxyethyl, phenyl, p-chlorophenyl, and the like.

At least one of the members of the following group of ethylenically unsaturated monomers which readily homopolymerize or readily copolymerize with other ethylenically unsaturated compounds either in bulk, or in an aqueous solution, or as an emulsion may be used: ethylenically unsaturated aromatic compounds and mono, di, tri, tetra and penta substituted aromatic compounds, wherein the ring is substituted with at least one member selected from the class consisting of alkyl (substituted and unsubstituted) having from 1 to 7 carbon atoms and/or with inorganic electron-accepting and/or inorganic electron-donating groups such as halogen, nitro, sulfono, etc., and wherein the ethylenically unsaturated moiety has from 2 to 5 carbon atoms, either substituted or unsubstituted such as alpha-methylstyrene, p-chloromethylstyrene, o-methylstyrene, m-methylstyrene, 2,4-dimethylstyrene, 2,5-dimethylstyrene, 2,4,5-trimethylstyrene, p-ethylstyrene, o-bromostyrene, 2-bromo-4-ethylstyrene, p-isopropylstyrene, p-chlorostyrene, 2,4-dichlorostyrene, p-bromostyrene, o-chlorostyrene, m-chlorostyrene, beta-chlorostyrene, 2,5-dichlorostyrene, 4-ethoxystyrene, p-isopropyl-alpha-methylstyrene, beta-nitrostyrene, p-nitrostyrene and the like; also polymerizable alkylacrylic acids having from 1 to 5 carbon atoms in the alkyl chain provided, in all instances, where there is no alkyl chain, the substituent is hydrogen or some other specified moiety, such as halogens, cyano, etc., e.g., acrylic acid, methacrylic acid, alpha-chloroacrylic acid, 2-furfurylacrylic acid and the like; alkylacrylic acid esters having from 1 to 5 carbon atoms in the alkyl chain provided, in all instances, when there is no alkyl chain, the substituent is hydrogen or some other specified moiety, such as halogen, cyano, etc., and wherein the esters are formed from monohydric alcohols (substituted and unsubstituted) selected from the group consisting of alkyl alcohols having from 1 to 20 carbon atoms such as amyl acrylate, amyl methacrylate, benzyl methacrylate, benzyl acrylate, glycidyl methacrylate, butyl acrylate, butyl methacrylate, dodecyl acrylate, cyclohexyl acrylate, cyclopentyl methacrylate, ethyl acrylate, methyl-alpha-bromoacrylate, methyl-alpha-chloroacrylate, ethyl methacrylate, 2-ethylhexyl acrylate, heptyl acrylate, ethyl-alpha-bromoacrylate, hexyl methacrylate, lauryl methylacrylate, methyl acrylate, methyl methacrylate, stearyl acrylate, stearyl methacrylate, propyl acrylate, 2-bromoethyl acrylate, 2-chloroethoxyethyl methacrylate, etc.; the substituted amino alcohols having from 2 to 7 carbon atoms in the alkyl chain and from 1 to 7 carbon atoms in the alkyl chain on the amino moiety such as N,N-dimethylaminoethyl acrylate, N-t-butylaminoethyl methacrylate, N,N - diethylaminoethyl acrylate, 2 - N - morpholinethyl methacrylate and the like; nitro alcohols wherein the alkyl chain has from 2 to 7 carbon atoms such as 3-nitro-2-butanol, 2-nitro-3-hexanol, 2-methyl-2-nitro-1-butanol, 2-nitro-2-methyl propanol, etc.; cyanoalkyl alcohols wherein the alkyl chain has from 2 to 7 carbon atoms such as 2-cyanoethyl acrylate and the like; unsaturated polymerizable alkylacrylic acid amides having from 1 to 5 carbon atoms in the alkyl chain provided, in all instances, when there is no alkyl chain, the substituent is hydrogen or some other specified moiety described above, and also wherein the amide is formed from ammonia, primary and secondary amine or a diamine having from 1 to 16 carbon atoms (substituted and unsubstituted) such as acrylamide, methacrylamide, ethacrylamide, methylene-bis-acrylamide, t-butylacrylamide, 2-cyanoacrylamide, N-(p-chlorophenyl) methacrylamide, N,N-diallylacrylamide, N,N-dimethylacrylamide, hexamethylene - bis - acrylamide, N-alpha-naphthylacrylamide, etc.; or the ethylenically unsaturated nitriles such as acrylonitrile, methacrylonitrile, ethacrylonitrile, alpha-chloroacrylonitrile and the like; polymerizable alkylene glycol and polyhydric glycol alkylacrylates and dialkylacrylates having 1 to 5 carbon atoms in the alkyl chain provided, in all instances, when there is no alkyl chain, the substituent is hydrogen or some other specified moiety described above, such as ethylene glycol dimethacrylate, triethylene glycol dimethacrylate, polyethylene glycol dimethacrylate, tetramethylene dimethacrylate, glyceryl triacrylate, hydroxyethyl methacrylate, hydroxypropyl methacrylate and the like; fatty acid esters of 1-olefins (substituted and unsubstituted), containing from 2 to 24 carbon atoms but preferably from 2 to 18 atoms wherein the 1-olefin alcohol precursor of the fatty acid esters has from 2 to 8 carbon atoms but preferably 2 to 3 carbon atoms, such as, vinyl acetate, vinyl propionate, vinyl butyrate, isopropenylacetate, vinyl-n-hexanoate, vinylchloroacetate, vinylcrotonate, vinyl-n-decanoate, vinyl-formate, vinyl-2-ethyl hexoate, vinyl laurate, vinyl oleate, vinyl stearate, vinyl trifluoroacetate, allyl linolate, allyl oleate, allyl acetate, allyl propionate, allyl chloroacetate, allyl caproate, allyl butyrate, etc.; aromatic acid esters (substituted and unsubstituted) of unsaturated alcohols wherein the alcohol precursor has from 2 to 8 carbon atoms but preferably from 2 to 3 carbon atoms such as allyl benzoate, diallyl phthalate, vinyl phthalate, vinyl benzoate, etc.; ethylenically unsaturated aliphatic diacids containing from 4 to 10 carbon atoms but preferably from 4 to 6 carbon atoms, and their esters, nitriles and amides such as, itaconic acid, maleic acid, fumaric acid, dimethyl maleate, dibutyl maleate, dimethyl fumarate, dibutyl fumarate, maleic anhydride, diethyl fumarate, etc.; polymerizable aliphatic dienes such as butadiene, 2,3-dimethyl butadiene, isoproprene, pentadiene, etc., and the haloprenes such as chloroprene and the like; 1-olefins (substituted and unsubstituted) containing from 2 to 18 carbon atoms but preferably from 2 to 8 carbon atoms such as vinyl chloride, vinylidene chloride, allylamine, diallylamine, diallylphosphate, allyl chloride, nitroethylene, butadiene monoxide, vinyl acrylate and the like; the vinyl ethers (substituted and unsubstituted), such as vinylethyl ether, vinylpropyl ether, vinylisobutyl ether, vinyl-2-methoxyethyl ether, vinyl-n-butyl ether, vinyl 2-chloroethyl ether, vinyl-2-ethylhexyl ether and the like or other vinyl compounds such as divinylsulfone, divinylsulfide, divinylbenzene, etc.; ethylenically unsaturated heterocyclic compounds wherein the heterocycle contains from 3 to 5 carbon atoms and the hetero atoms are selected from the group consisting of N, O and S such as the vinyl pyridines, N-vinyl pyrrolidone, vinyl furan, alpha vinyl thiophene and the like. In general, the only requirement necessary in order for a monomer to be useful in this invention is that it has at least one olefinic double bond which readily homopolymerizes or readily copolymerizes with other ethylenically unsaturated compounds either in bulk, or in an aqueous solution, or as an emulsion.

More specifically, at least one member of the following group of polymerizable or copolymerizable monomers is useful; styrene, p-chloromethyl styrene, sodium p-styrene-sulfonate, vinyl toluene, 2,5-dichlorostyrene, alpha-methyl styrene, acrylamide, acrylic acid, acrylonitrile, N-t-butyl acrylamide, methacrylamide, N,N-methylene-bisacrylamide, N,N-diethylacrylamide, methacrylic acid, t-butylaminoethyl methacrylate, N,N-diethylaminoethyl acrylate, N,N-diethylaminoethyl methacrylate, N,N-dimethylaminoethyl acrylate, 2-cyanoethyl acrylate, n-butyl acrylate, n-butyl methacrylate, decyl acrylate, decyl methacrylate, ethyl acrylate, 2-ethylhexyl acrylate, ethyl methacrylate, glycidyl acrylate, glycidyl methacrylate, n-hexyl methacrylate, n-lauryl methacrylate, methyl acrylate, methyl methacrylate, decyl-octyl methacrylate, stearyl methacrylate, ethylene glycol dimethacrylate, triethylene glycol dimethacrylate, tetraethylene glycol dimethacrylate, polyethylene glycol dimethacrylate, hydroxypropyl methacrylate, hydroxyethyl methacrylate, diallyl adipate, diallyl maleate, N,N-diallyl melamine, diallyl phthalate, diallyl phosphite, diallyl phosphate, diallyl fumarate, vinyl chloride, vinylidene chloride, maleic acid, itaconic acid, fumaric acid, di-n-butyl fumarate, di-n-butyl maleate, di-n-butyl itaconate, diethyl maleate, methyl vinyl ketone, 2-methyl-5-vinylpyridine, N-vinyl carbazole, 2-vinyl pyridine, 1-vinyl-2-pyrrolidone, N-vinyl pyrrolidone, vinyl-n-butyl ether, vinyl-isobutyl ether, vinyl-2-chloroethyl ether vinyl ethyl ether, vinyl-2-ethylhexyl ether, vinyl triethoxysilane, vinyl stearate, vinyl butyrate, vinyl acetate, vinyl-2-ethyl-hexoate, vinyl propionate, divinyl benzene and divinyl sulfone.

SUBSTRATES

The water-insoluble substrates utilized in the graft polymerization processes described herein are thioated keratinaceous polymers.

The term "substantially water-insoluble" means a substrate whose solubility, in the form in which it is employed, in water at 30° C. or less does not exceed about 10 percent of its weight. Because the substrate used in the graft polymerizations described herein is usually formed under alkaline conditions, both it and the polymeric substance from which it is formed must also be substantially alkaline insoluble, at least at the alkaline pH used to form the substrate and to graft polymerize, if alkaline conditions are employed.

The thioated substrates are, except as otherwise stated herein, dithiocarbonate derivatives and monothiocarbonate derivatives or more precisely, as disclosed in the examples hereinafter and more fully in applications S.N. 432,825 and 432,853, dithiocarbonate-dithiocarbamate and monothiocarbonate-monothiocarbamate derivatives of the parent keratinaceous polymer. For the sake of brevity, they are referred to hereinafter (except in the examples) as dithioated and monothioated derivatives, respectively. These thioated substrates can be produced by the reaction of an alkaline form of the parent polymer with carbon disulfide and carbonylsulfide, respectively.

The thioated keratin substrates are those prepared from wool and other forms of hair, fur, and animal protein, e.g., sheep wool, silk, cashmere, camel hair, alpaca, llama, vicuna, angora rabbits, squirrel, Chinese hog and badger hair, hides, leather, feathers, skins, regenerated protein, etc. They can be used in their various conventional forms, e.g., as such or in the form of thread, yarn, non-woven fabric, knitted fabric, woven cloth, garments, etc.

DESCRIPTION OF PROCESS

A. Thioated substrate formation

The term "thioated substrate" embraces dithioated and monothiated substrates and the corresponding substrates produced by disproportionation or rearrangement during mono- or di-thioation.

The thioated substrate which is graft polymerized can be prepared by wetting the corresponding non-thioated substrate with an alkaline solution. This is done, generally, with a sodium hydroxide solution, or a solution of some other alkali metal hydroxide. The strength of the alkaline solution used in each particular case will be dependent, of course, upon the nature of the substrate and the type of end-product desired; but generally, concentrations in the range of about .05 molar to about 1 molar are preferred. The amount of alkali or alkaline salt or mixtures of alkalies and alkaline salts used is that amount necessary to achieve the desired degree of thioation of the substrate. Unless a very high or very low degree of thioation is desired, the amount of alkali employed is not particularly critical so long as it does not result in the production of a water soluble thioate. Such alkalies as lithium, sodium, potassium, rubidium, and cesium hydroxides, ammonium hydroxide, quaternary ammonium hydroxides such as tetramethylammonium hydroxide, methyltriethylammonium hydroxide, trimethylbenzylammonium hydroxide and the like, quaternary phosphonium hydroxides such as tetraethylphosphonium hydroxide, trimethylphenylphosphonium hydroxide, methyltriethylphosphonium hydroxide, trimethylisoamylphosphonium hydroxide, and the like, sulfonium hydroxides such as triethylsulfonium hydroxide, methyldiethylsulfonium hydroxide, dimethylbenzylsulfonium hydroxide, methyldiethylsulfonium hydroxide and the like, quaternary arsonium hydroxides such as trimethylphenylarsonium hydroxide, tetraethylarsonium hydroxide, methyltriphenylarsonium hydroxide and the like, and quaternary stibonium hydroxides such as tetramethylstibonium hydroxide, tetraethylstibonium hydroxide, methyltriethylstibonium hydroxide and the like, as well as the slightly soluble alkaline earth metal hydroxides such as calcium, strontium, barium, etc. may be used, although the preferred method of preparation of the alkaline earth metal salts of the thioated substrate is from the alkali metal salt of the thioated substrate by metathesis. An alkali metal salt of the thioated substrate may also be converted to a quaternary ammonium sulfonium, quaternary phosphonium, quaternary arsonium or quaternary stibonium salt of the thioated substrate through metathesis.

In addition to the strong and relatively strong bases mentioned above, basic salts, and water soluble organic amines serve equally well. Such basic salts, or mixtures of these salts as sodium carbonate, trisodium phosphate, disodium hydrogen phosphate, disodium ammonium phosphate, sodium silicate, sodium aluminate, sodium antimoniate, sodium stannate, sodium cyanide, sodium cyanate, sodium sulfide, potassium carbonate, tripotassium phosphate, dipotassium phosphate, potassium silicate, potassium aluminate, potassium antimoniate, potassium stannate, potassium cyanide, potassium cyanate, potassium sulfide, lithium carbonate, trilithium phosphate, dilithium hydrogen phosphate, lyithium silicate, and the like, as well as such water-soluble amines as methylamine, ethylamine, dimethylamine, pyridine, and such quaternary ammonium hydroxides as tetramethylammonium hydroxide and benzyltrimethylammonium hydroxide are just a few examples of basic materials which have served equally well in the preparation of the various water-insoluble thioates. In fact, a basic salt whose aqueous solution has a pH of about 8 or 9 or greater may be suitable. It should be recognized, also, that a mixture consisting of a basic salt and an inorganic or organic hydroxide is included in this group. However, those basic salts which are known to chemically modify the substrate and which would thereby interfere with the thioation process are to be avoided when practicing this invention.

Thioation can be accomplished by bringing the alkaline-wet substrate into intimate contact with carbon disulfide or carbonyl sulfide. Either vaporous carbon disulfide or carbonyl sulfide or a solution of the sulfide in any inert solvent or an aqueous emulsion of the sulfide in an inert water immiscible organic solvent may be used. The thioation reaction is conducted as long as is necessary to acquire the desired degree of thioation. Usually merely exposing the alkaline substrate to the carbonyl sulfide or carbon disulfide suffices.

Thioation is of a relatively low order, i.e., substrates are produced having thioate sulfur contents of the order of 0.5 percent and usually 0.3 percent or less. This low thioation is, of course, vital when it is possible to produce a water-soluble thioated substrate. The techniques known in the art can be used to produce water insoluble thioated substrates, e.g., using carbon disulfide in the presence of alkali to produce a dithioated substrate and carbonyl sulfide in the presence of alkali to produce a monothioated substrate.

A wide variety of thioate salts can be produced by reacting, by metathesis, an ammonium, organic ammonium, phosphonium, sulfonium, arsonium, stibonium salt or an alkali metal salt such as lithium, sodium, potassium, etc. of the thioated substrate with a water-soluble salt of a metal or mixture of metals from Group Ib of the Periodic Table such as Cu, Ag, and Au; Groups IIa and IIb such as Mg, Ca, Sr, Zn, Cd, etc.; Groups IIIa and IIIb such as Sc, Y, La, Al, Ga, etc. Group IVb such as Ti, Zr, etc., as well as Ge, Sn and Pb; Group Vb such as V, Nb, etc.; as well as Bi; Group VIb such as Cr, W, etc.; Group VIIb such as Mn, etc.; and Group VIII such as Fe, Co, Ni, Os, etc., to yield a new thioate derivative of the metal.

In general, the previously described alkali metal salts of the thioated substrate are used if copolymerization is to be carried out without undue delay. At times, however, it is advantageous to effect a conversion of the alkali metal thioate salt to a salt which is more stable, or which is a more reactive intermediate. For example, an aluminum salt of the thioated substrate is prepared by passing an aluminum sulfate or aluminum acetate solution through, about, or over an alkali metal salt of the thioated substrate. The zinc salt is prepared from zinc chloride or some other soluble zinc salt, zirconyl salt from zirconium oxychloride, uranyl salt from uranyl acetate, lead thioate from lead acetate, and ferrous salt from ferrous ammonium sulfate or ferrous chloride, etc. This technique is especially useful when a soluble hydroxide or basic salt of the desired cation is non-existent or unavailable.

The thioated substrate, when graft polymerized with the monomer, must be substantially free from any water-soluble by-products of the thioate formation or thioate substrate decomposition, i.e., decomposition of thioate groups, which are known in the art to be labile. Thus, after its formation the thioated substrate, in the form of an alkali metal salt, alkaline earth metal salt, or an ammonium salt, or the previously described converted metal salts, is washed with water to remove water-soluble reaction by-products and free metal ions, preferably immediately prior to its suspension in an emulsion or solution of the polymerizable ethylenically unsaturated monomer to ensure no further formation of by-products prior to polymerization.

B. *Polymerization*

Graft polymerization is accomplished by reacting the thioate derivative of the substrate either as a salt or the corresponding free acid obtained by converting an ammonium, organic ammonium, sulfonium, phosphonium, arsonium, stibonium, or an alkali metal salt of the thioated derivative to the free acid of the thioated substrate, with an ethylenically unsaturated monomer or monomers from one of the groups set out above in the presence of a peroxidic free radical initiator.

The copolymerization reaction is conducted in either an aqueous or non-aqueous system, but preferably and ordinarily in an aqueous system, in which the monomer is uniformly distributed. When the reaction medium is aqueous, a solution, suspension, or an emulsion of the ethylenically unsaturated monomer can be used to achieve uniform distribution of the monomer. The presence of a wetting agent in the reaction medium is advantageous since it facilitates monomer penetration into the thioate substrate. Emulsifiers can be used to achieve a uniform emulsion of an insoluble monomer and/or peroxidic initiator.

The selected thiote salt or free acid can be used in virtually any proportion to the monomer, e.g., from about 0.5 percent to 99.9 percent by weight based on the ethylenically unsaturated monomer. The monomer can also be used in almost any concentration in the solution, e.g., from about 1 percent to about 100 percent of the total reaction solution. The solution can be buffered, if necessary, or its pH adjusted to provide the best polymerization conditions for the selected monomers. After adding a water soluble peroxidic free-radical initiator to the solution containing the substrate and monomer, the reaction will proceed at virtually any temperature, e.g., from about 0° to about 100° C. Reaction times can vary from 3 minutes to about 96 hours or longer and reaction pressure can be atmospheric, subatmospheric or superatmospheric, depending upon the monomer and the type of product desired. The thioated substrate can also be added to a mixture of the monomer and peroxidic initiator in the selected reaction media. The usual graft polymerization techniques employing a peroxidic initiated system can be used. However, because of the ease of graft polymerization, less rigorous conditions are ordinarily required. For example, mildly acidic aqueous conditions at room temperature are sufficient to achieve any degree of monomer add-on desired, e.g., from 5 percent to 500 percent.

As is well known in the art, the properties of the graft polymer produced depends upon the substrate used, the monomer or mixture of monomers used, the percent of add-on of monomer achieved, and the reaction conditions employed.

The graft polymer can, if desired, be purified using conventional techniques, e.g., to remove sulfur containing products, monomer, homopolymer, alkali, etc.

In the practice of this invention, it is possible to design the final macromolecular products so that they have a wide range of properties by controlling the extent or degree to which thioate groups have been added to the polymeric substrate. For example, it is possible to introduce a few thioate groups per polymer molecule by merely reacting a very small percentage of the reactive sites present in the polymeric substrate with carbonyl sulfide or carbon disulfide; on the other hand, all or nearly all of the reactive sites may be converted by carbon disulfide to thioate groups. It is preferred, however, that the degree of thioation be such that there is no apparent outward change in the physical form of the thioated derivative, nor that the thioate derivative becomes soluble in water. Also, all or substantially all water-soluble by-products arising from the thioation reaction ought to be removed prior to the copolymerization, e.g., by washing.

Because the thioate groups of the substrate are unstable, it is preferred that the graft polymerization process be part of a multiple step process comprising (a) forming the thioated substrate, (b) washing the substrate with water to remove the water-soluble by-products of the thioate step, and (c) mixing the freshly washed thioated substrate with the monomer-peroxidic initiator solution to initiate polymerization. Homoploymer formation can sometimes be significantly reduced by employing these steps as part of an uninterrupted sequence, at least the washing and polymerization steps.

*Graft polymerization of keratinaceous substrates*

When graft polymerizing wool and other keratinaceous substrates, the strength of the sodium hydroxide used to form the thioate derivative usually ought not exceed 0.5 molar, in order to prevent alkaline damage to the substrate, although a range of about 0.05 to about 3 can be used. Similarly high temperatures when the substrate is at an alkaline pH ought to be avoided. The polymerization solution preferably is buffered to from less than one to 8, more preferably about 1 to 7 and desirably about 1.0 to 5.0.

In order to describe the present invention so that it may be more clearly understood, the following examples are set forth in which all parts are expressed in parts by weight unless otherwise stated. These examples are set forth primarily for the purpose of illustration, and any specific enumeration of detail contained therein should not be interpreted as a limitation on the concept of this invention.

*Example 1a.*—Five parts of wool were placed in a beaker containing enough 0.125 M sodium hydroxide solution to cover it completely for ¼ hour and then filtered on a Büchner funnel. The resultant alkaline-wet wool was then placed in an evacuated vacuum desiccator over carbon disulfide for about 2 hours in order to form a dithiocarbonated-dithiocarbamated derivative of the wool. This dithiocarbonated-dithiocarbamated wool was then suspended in about 200 parts of water, filtered on a Büchner funnel, and washed on the Büchner funnel with water (300–400 parts) in order to remove all soluble by-products which had formed during the dithiocarbonation process. After washing, the moist dithiocarbonated-dithiocarbamated wool was suspended in a previously prepared emulsion consisting of 3.75 parts styrene, 0.25 part acrylonitrile, 150 parts water (distilled), 0.5 part Tween–85 (a polyoxyethylene sorbitantrioleate), and 1.75 parts of 30% hydrogen peroxide.

After standing at room temperature (25°–27° C.) for about 23½ hours, the copolymerized wool was removed from the polymerization mixture and thoroughly washed with water. The product, oven dried, weighed 7.05 parts which constitutes a 78.3% yield of the theoretical. Prolonged extraction of this material with ethylene trichloride indicated that 85.2% of the monomer which had been converted to polymer was nonextractable.

*Example 2a.*—Five parts of wool were reacted in the manner described in Example 1a above. The dithiocarbonated-dithiocarbamated wool was then washed thoroughly on a Büchner funnel with water to remove soluble by-products and then 100 parts of 0.06 M lead acetate solution were passed over and through the wool derivative to form lead wool dithiocarbonate-dithiocarbamate by metathesis. The lead product, after washing with sufficient water (150–200 parts) to remove excess lead ions, was added to an emulsion prepared from 3.75 parts styrene, 0.25 part acrylonitrile, 150 parts of distilled water, 0.5 part of Tween–85 and 1.75 parts of 30% hydrogen peroxide. After 23½ hours contact at room temperature with this emulsion the wool copolymer was washed well with water and dried. The yield of copolymer amounted to 7.90 parts which constitutes an 87.7% yield of the theoretical. Prolonged extraction with trichloroethane showed that 96.5% of the monomer which had been converted to copolymer could not be removed.

*Examples 3a–6a.*—Five parts of wool were reacted and converted to various wool dithiocarbonate-dithiocarbamate salts by metathesis in the manner described in Example 2a. Each dithiocarbonate-dithiocarbamate derivative was suspended for 23½ hours in a polymerization mixture as that described in Example 1a before being processed for yield. Some of the results, representative of the various wool dithiocarbonate-dithiocarbamate salts used, are tabulated below:

| Example No. | Cation | Percent Theoretical Yield | Percent Nonextractable Copolymer |
|---|---|---|---|
| 3a | Aluminum | 86.7 | 94.6 |
| 4a | Ferrous | 93.0 | 86.7 |
| 5a | Zinc | 91.5 | 96.9 |
| 6a | Nickel | 86.7 | 96.4 |

*Example 7a.*—Five parts of wool were reacted in the manner described in Example 1a. This wool derivative was then suspended in a solution consisting of 5.0 parts acrylamide, 150 parts water and 1.75 parts of 30% hydrogen peroxide. Upon standing at room temperature for 23½ hours, the wool copolymer was removed from the polymerization mixture and thoroughly washed with water. The dried product weighed 7.7 parts which constitutes a 50.0% conversion of monomer to unextractable polymer.

*Examples 8a–11a.*—Five parts of wool were reacted with carbon disulfide and converted to various wool dithiocarbonate-dithiocarbamate salts by metathesis in the manner described in Example 2a. Each wool salt derivative was suspended for 23½ hours in a polymerization mixture as that described in Example 7a before being processed for yields. Some of the results, representative of the various wool dithiocarbonate-dithiocarbamate salts used, are tabulated below:

| Example No. | Cation | Percent Conversion of Monomer to Unextractable Polymer |
|---|---|---|
| 8a | Aluminum | 67.0 |
| 9a | Zinc | 51.0 |
| 10a | Ferrous | 92.8 |
| 11a | Nickel | 63.0 |

*Example 12a.*—Five parts of wool were reacted in the manner described in Example 1a. Immediately after washing, the dithiocarbonated-dithiocarbamated wool was dispersed in an emulsion prepared from 4.5 parts ethyl acrylate, 150 parts water, 0.2 part Tween–85 and 1.75 parts of 30% hydrogen peroxide. After 23½ hours at room temperature, the wool copolymer was washed with water and dried. The copolymeric product amounted to 6.65 parts which constitutes a 70% yield of the theoretical. Prolonged extraction of the product with acetone indicated that 95.0% of the monomer which had been converted to polymer could not be extracted.

*Examples 13a–17a.*—Five parts of wool were reacted with carbon disulfide and converted to various wool dithiocarbonate-dithiocarbamate salts by metathesis in the manner described in Example 2a. Each wool salt derivative was suspended for 23½ hours in a polymerization mixture as that described in Example 12a before being processed for yield. Some of the results, representative of the various wool dithiocarbonate salts used, are tabulated below:

| Example No. | Cation | Percent Yield | Percent Non-extractable Copolymer |
|---|---|---|---|
| 13a | Aluminum | 84.3 | 96.6 |
| 14a | Zinc | 73.7 | 94.9 |
| 15a | Ferrous | 91.5 | 90.5 |
| 16a | Lead | 80.0 | 94.2 |
| 17a | Nickel | 84.4 | 96.7 |

*Example 18a.*—Five parts of mohair were placed in a beaker containing sufficient 0.50 M sodium silicate solution to cover it completely. This mixture was allowed to remain at room temperature for about ¼ hour then filtered on a Büchner funnel to remove excess silicate solution. The sodium silicate wetted mohair was then placed in an evacuated vacuum desiccator over carbon disulfide for about 1½ hours before washing the product in water and filtering on a Büchner funnel. Immediately after washing, the dithiocarbonated-dithiocarbamated mohair was suspended in an emulsion containing 4.0 parts acrylonitrile, 150 parts water, 0.2 part Tween-85 and 1.75 parts 30% hydrogen peroxide. After 23½ hours in the reaction medium, the mohair copolymer was washed thoroughly with water, yielding a dried product which amounted to (5.65 parts) 63.0% of the theoretical yield. Prolonged extraction of this copolymer with dimethylformamide indicated that all of the monomer which had been converted to polymer could not be extracted.

*Examples 19a–23a.*—Five parts of mohair were reacted as described in Example 18 and immediately thereafter converted to various salts by metathesis in the manner described in Example 2a. Each derivative was suspended for 23½ hours in a polymerization mixture as that described in Example 18a before being processed for yields. Some of the results, representative of the various mohair dithiocarbonate-dithiocarbamate salts used, are tabulated below:

| Example No. | Cation | Percent Yield | Percent Non-extractable Copolymer |
|---|---|---|---|
| 19a | Aluminum | 64.0 | 100.0 |
| 20a | Zinc | 70.5 | 100.0 |
| 21a | Ferrous | 82.7 | 100.0 |
| 22a | Lead | 67.8 | 100.0 |
| 23a | Cobalt | 61.0 | 100.0 |

*Examples 24a–26a.*—Five parts of mohair were placed in a beaker containing sufficient 0.5 M sodium silicate solution to cover it completely for ¼ hour and then reacted as described in Example 18a. The sodium dithiocarbonate-dithiocarbamate salt was suspended in each of the following polymerization media:

| Ex. No. | Monomer | Procedure | Percent Yield | Percent Non-extractable Polymer |
|---|---|---|---|---|
| 24a | Ethyl acrylate | Ex. 12a | 70.0 | 89.5 |
| 25a | Acrylamide | Ex. 7a | 74.0 | 100.0 |
| 26a | Styrene/Acrylonitrile | Ex. 1a | 78.0 | 95.0 |

*Example 27a.*—Five parts of wool were placed in a beaker with enough 4% ammonium hydroxide to cover it completely. After about ¼ hour the wool was filtered of excess base on a Büchner funnel and then placed in a vacuum desiccator containing carbon disulfide for 2 hours. The resultant product was suspended in about 200 parts of water and followed by filtration on to a Büchner funnel. After further washing with water on the Büchner funnel, the dithiocarbonated-dithiocarbamated wool was suspended in an emulsion consisting of 3.75 parts of styrene, 0.25 part acrylonitrile, 150 parts water, 0.5 part Tween-85, and 1.75 parts 30% hydrogen peroxide. After 23 hours in this emulsion, the copolymerized wool was washed thoroughly with water. The dried product amounted to 74.5% (6.7 parts) of the theoretical yield and 94% of the monomer which had been converted to polymer could not be extracted with trichloroethane.

*Examples 28a–33a.*—Five parts of mohair were treated with various alkaline solutions and each then subjected to dithiocarbonation-dithiocarbamation and copolymerization as described in Example 1a. The alkaline materials used, as well as the results obtained, are tabulated below:

| Ex. No. | Alkaline Material | Con'n of Alkaline Solution | Percent Yield of Theoretical | Percent Non-extractable Polymer |
|---|---|---|---|---|
| 28a | Sodium Aluminate | 0.5 M | 90.0 | 95.1 |
| 29a | Sodium Bicarbonate | Saturated | 74.0 | 100.0 |
| 30a | Sodium Carbonate | Saturated | 76.0 | 97.2 |
| 31a | Methyl Amine | 2% | 74.0 | 100.0 |
| 32a | Triethylamine | 2% | 74.0 | 93.7 |
| 33a | Sodium Stannate | 0.5 M | 76.0 | 86.0 |

*Examples 34a–37a.*—Five parts of mohair were treated with various alkaline solutions and each then subjected to the thiocarbonation as described in Example 1a. The resultant dithiocarbonate-dithiocarbamate derivatives were converted to the zinc salt with 0.06 M zinc acetate by metathesis and copolymerized as described in Example 12a. The alkaline materials used, as well as the results obtained, are tabulated below:

| Ex. No. | Alkaline Material | Con'n of Alkaline Solution | Percent Yield of Theoretical | Percent Non-extractable Polymer |
|---|---|---|---|---|
| 34a | Sodium Aluminate | 0.5 M | 84 | 93 |
| 35a | Sodium Carbonate | Saturated | 81 | 96 |
| 36a | Sodium Cyanide | 0.5 M | 80 | 98 |
| 37a | Methylamine | 2% | 83 | 95 |

*Examples 38–42a.*—A number of 5-part samples of mohair fibers were treated and reacted as described in Example 1a with the exception that the styrene/acrylonitrile mixture was replaced with 5 parts of various monomers. These substitutions and their results are as follows:

| Ex. | Monomer | Percent Conversion of Monomer to Polymer on Substrate | Percent Non-extractable polymer |
|---|---|---|---|
| 38a | 2-cyanoethyl acrylate | 75 | 95 |
| 39a | Methacrylamide* | 81 | 100 |
| 40a | Hydroxyethyl methacrylate | 73 | 94 |
| 41a | Hydroxypropyl methacrylate | 70 | 90 |
| 42a | Vinylidene chloride | 62 | 93 |

*Tween-85 omitted from this reaction.

*Examples 43a–49a.*—A number of 5-part samples of wool fibers were treated and reacted as described in Example 4a. Ferration was accomplished by suspending the thioated substrate for about 1 minute in a 0.004% aqueous solution of ferrous ammonium sulfate. For each treated specimen, the styrene/acrylonitrile monomer mixture was replaced with 5 parts of a different monomer. The following table lists the results of these reactions:

| Ex. | Monomer | Percent Conversion of Monomer to Polymer on Substrate | Percent Non-extractable polymer |
|---|---|---|---|
| 43a | 2-ethylhexyl acrylate | 82 | 94 |
| 44a | Styrene | 92 | 93 |
| 45a | Vinyl toluene | 85 | 91 |
| 46a | Vinyl acetate* | 85 | 90 |
| 47a | Isoprene* | 62 | 100 |
| 48a | Isoprene Co Acrylonitrile (75/25).* | 76 | 95 |
| 49a | Vinyl chloride Co vinylidene chloride (30/72). | 84 | 89 |

*Polymerized at 50° C. for 4 hours.

*Example 1b.*—Five parts of wool were placed in a beaker containing enough 0.125 M sodium hydroxide solution to cover it completely for ¼ hour and then filtered on a Büchner funnel. This alkaline wool was then placed in a gas drying tower, the outlet of which led to a mercury reservoir so that a slight gas pressure could be maintained within the drying tower. The inlet port of the drying tower was connected to a cylinder of carbonyl sulfide and sufficient carbonyl sulfide was flushed through the system to displace the air and to maintain a slight pressure to the atmosphere of carbonyl sulfide remaining over the alkaline wool. After about fifteen minutes exposure time to the carbonyl sulfide, the wool was suspended in about 200 parts of water, filtered on a Büchner funnel and washed well with about 300 parts of water, then uniformly dispersed in a previously prepared emulsion consisting of 95 parts of water, 3.75 parts styrene, 0.25 part acrylonitrile, 1 part 10% hydrochloric acid, 0.5 part Tween-85 (a polyoxyethylene sorbitan trioleate) and 1.5 parts of 30% hydrogen peroxide.

After remaining at room temperature for 18 hours, the copolymer was removed from the polymerization medium and thoroughly washed with water. Upon drying, the product weighed 8.05 parts. This constituted an 89.5% yield of the theoretical. Prolonged extraction of this material with ethylene trichloride indicated that 92% of the monomer which had been converted to polymer could not be extracted.

*Example 2b.*—Five parts of wool were monothiocarbonated-monothiocarbamated in a manner described in Example 1b and then suspended in an emulsion consisting of 4.5 parts ethyl acrylate, 95 parts water, 0.3 part Tween-85 and 1.0 part of 10% hydrochloric acid and 1.5 parts of 30% hydrogen peroxide.

After remaining at room temperature for 18 hours, the copolymer was removed from the polymerization medium and throughly washed with water. Upon drying, the wool product weighed 6.5 parts. This constituted a 66.4% yield of the theoretical. Prolonged extraction of this material with acetone indicated that 89% of the monomer which had been converted to polymer could not be extracted.

*Example 3b.*—Five parts of wool were monothiocarbonated-monothiocarbamated in a manner described in Example 1b and the resultant product was then washed well with about 300 parts of water followed by 100 parts of 0.06 M lead acetate solution which was passed over and through the wool derivative to form lead wool monothiocarbonate-monothiocarbamate by metathesis. The load derivative was washed with about 150 parts of water, then uniformly dispersed in an emulsion such as that described in Example 1b.

After standing at room temperature for 18 hours, the copolymer was removed from the polymerization medium and thoroughly washed with water. Upon drying, the pulp weighed 8.4 parts which constituted at 93% yield of the theoretical. Repeated extractions with ethylene trichloride indicated that 85.5% of the monomer which has been converted to polymer could not be extracted.

*Example 4b.*—Five parts of wool were monothiocarbonated-monothiocarbamated as described in Example 1b and immediately thereafter converted by metathesis to zinc wool monothiocarbamate-monothiocarbonate by substituting 0.06 M zinc acetate for 0.06 M lead acetate as illustrated in Example 3b and suspended in an emulsion consisting of 4.0 parts acrylonitrile, 95 parts water, 1 part of 10% hydrochloric acid, 0.3 part Tween-85 and 1.5 parts of 30% hydrogen peroxide.

After standing at room temperature for 18 hours, the copolymer was removed from the polymerization medium and thoroughly washed with water. Upon drying, the product weighed 6.4 parts which constituted a 71.0% yield of the theoretical. Repeated extractions with dimethylformamide indicated that 70.3% of the monomer which had been converted to polymer could not be extracted.

*Example 5b.*—Five parts of wool were placed in a beaker containing sufficient 0.25 M sodium silicate solution to cover it completely for about ¼ hour and then monothiocarbonated-monothiocarbamated as described in Example 1b. This wool was then dispersed in a solution consisting of 5.0 parts acrylamide, 95 parts water and 1.5 parts of 30% hydrogen peroxide.

Upon standing at room temperature for 18 hours, the wool copolymer was removed from the polymerization mixture and thoroughly washed with water. The dried product weighed 6.3 parts which constitutes a 25.4% conversion of monomer to unextractable polymer.

*Example 6b.*—Five parts of wool were monothiocarbonated-monothiocarbamated as described in Example 5b and then suspended in an emulsion prepared from 4.0 parts acrylonitrile, 95 parts water, 0.3 part Tween-85 and 1.5 parts hydrogen peroxide (30%). After 18 hours, the copolymerized wool was washed well with water. The dried product amounted to a 73.5% yield of the theoretical (6.6 parts). Extraction with dimethyl formamide indicated that 94% of the monomer which had been converted to polymer could not be extracted.

*Example 7b.*—Five parts of wool were placed in a beaker containing sufficient 0.25 M sodium silicate solution to cover it completely for about ¼ hour and then monothiocarbonated-monothiocarbamated as described in Example 1b. This wool derivative was then converted by metathesis to aluminum wool monothiocarbonated-monothiocarbamated by substituting 0.06 M aluminum acetate for 0.06 M lead acetate, as described in Example 3b, and then uniformly dispersed in an emulsion such as that described in Example 1b.

After 18 hours at room temperature, the copolymer was removed from the polymerization medium and thoroughly washed with water. Upon drying, the product weighed 8.3 parts. This was 92.0% of the theoretical yield and repeated extractions with dimethylformamide indicated that 88% of the monomer which had been converted to polymer could not be extracted.

*Example 8b.*—Five parts of wool were monothiocarbonated-monothiocarbamated as described in Example 5b and converted by metathesis to a zinc derivative, as described in Example 4b. This zinc wool monothiocarbonate-monothiocarbamate was then suspended in an emulsion such as that described in Example 2b.

After 18 hours, the copolymerized wool was washed with water and dried. The product yield amounted to 7.40 parts which constitutes 78% yield of the theoretical. Prolonged extraction in acetone indicated that 95.8% of the monomer which had been converted to polymer could not be extracted.

*Example 9b.*—Five parts of wool were monothiocarbonated-monothiocarbamated as described in Example 5b and the resultant wool was then washed well with about 300 parts of water followed by 100 parts of 0.06 M nickel sulfate solution. The resultant nickel wool monothiocarbonate-monothiocarbamate was washed well with about 150 parts of water, then uniformly dispersed in an emulsion such as that described in Example 1b.

After standing for 18 hours at room temperature, the copolymerized wool was removed and washed well with water. Upon drying, the product weighed 8.4 parts which constituted a 93.5% yield of the theoretical. Extraction with ethylene trichloride revealed that 94% of the monomer which had been converted to polymer was nonextractable.

*Examples 10b–14b.*—Five part samples of wool were soaked in a sufficient amount of various alkali and alkaline salt solutions and each then subjected to the monothiocarbonation and copolymerization as described in Example 2b. The alkali and alkaline salts used, as well as the results obtained, are tabulated below as Examples 10b through 14b.

| Ex. | Alkaline Material | Con'n of Alkaline Solution | Percent Yield of Theoretical | Percent Polymer Non-extractable |
|---|---|---|---|---|
| 10b | Ammonium Hydroxide. | 1.45 M | 85.5 | 95.2 |
| 11b | Sodium Aluminate. | 0.25 M | 67.5 | 92.7 |
| 12b | Sodium Sulfide. | 0.25 M | 78.0 | 95.0 |
| 13b | Sodium Bicarbonate. | 0.25 M | 75.0 | 93.0 |
| 14b | Sodium Carbonate. | 0.25 M | 77.0 | 97.0 |

*Example 15b.*—Five parts of wool were placed in a beaker containing sufficient 0.25 M sodium aluminate solution to cover it completely for ¼ hour. This alkaline wool was then monothiocarbonated as described in Example 1b and the resultant wool derivative was then washed well with about 300 parts of water followed by 100 parts of 0.06 M cobaltous chloride solution. The resultant cobaltous wool monothiocarbonate-monothiocarbamate was washed well with about 150 parts of water then uniformly dispersed in an emulsion such as that described in Example 1b.

After standing for 18 hours at room temperature, the copolymer was removed and washed well with water. Upon drying, the product weighed 7.5 parts which constituted an 83% yield of the theoretical. Extraction with ethylene trichloride revealed that 100% of the monomer which had been converted to polymer was nonextractable.

*Example 16b.*—Five parts of wool were placed in a beaker containing sufficient 5% ammonium hydroxide solution to cover it completely for ¼ hour. The alkaline wool was then thiocarbonated and converted by metathesis to the cobalt salt in the manner described in Example 15b, above. The resultant cobaltous wool monothiocarbonate-monothiocarbamate was then suspended in a solution of 5.0 parts acrylamide, 95 parts water, 1 part 10% hydrochloric acid and 1.5 parts of 30% hydrogen peroxide.

After 18 hours at room temperature (25°–27° C.), the product was washed thoroughly with warm water and dried. The yield of copolymer amounted to 6.0 parts which constitutes a 20% conversion of monomer to unextractable polymer.

*Example 17b.*—Five parts of wool were soaked in 5% sodium bicarbonate for about ¼ hour and monothiocarbonated-monothiocarbamated as described in Example 1b. The resultant thiocarbonated wool was washed well with about 300 parts of water then treated with 100 parts of 0.06 M zinc acetate solution. The zinc wool monothiocarbamate-monothiocarbonate was washed with about 150 parts of water then uniformly dispersed in an emulsion such as that described in Example 1b.

After remaining for 18 hours at room temperature, the wool copolymer was removed from the polymerization medium and thoroughly washed with water. Upon drying, the product weighed 7.8 parts which constituted an 87% yield of the theoretical. Extraction with dimethylformamide revealed that 96% of the monomer which had been converted to polymer could not be extracted.

*Example 18b.*—Five parts of wool were soaked in 0.25 M sodium sulfide for about ¼ hour and thiocarbonated and converted by metathesis to the zinc derivative in a manner described in Example 17b, above. The zinc wool monothiocarbamate-monothiocarbonate was then suspended in a solution of 5.0 parts acrylamide, 1 part 10% hydrochloric acid, 95 parts water and 1.5 parts of 30% hydrogen peroxide.

After standing for 18 hours at room temperature, the wool copolymer was removed from the polymerization medium and thoroughly washed with water. Upon drying, the product weighed 6.7 parts which constituted 34% conversion of monomer to unextractable polymer.

*Example 19b.*—Five parts of wool were placed in a beaker containing sufficient 0.25 M sodium carbonate solution to cover it completely for about ¼ hour. This alkaline-wet wool was then monothiocarbonated-monothiocarbamated and converted by metathesis to the aluminum salt in a manner described in Example 7b. The aluminum wool monothiocarbonate-monothiocarbamate was then suspended in a solution of 5.0 parts acrylamide, 95 parts water, 1.0 part 10% hydrochloric acid and 1.5 parts of 30% hydrogen peroxide.

After 18 hours at room temperature, the copolymerized wool was removed from the polymerization medium and thoroughly washed with water. Upon drying, the product weighed 6.5 parts which constituted 27% conversion of monomer to unextractable polymer.

*Example 20b.*—Five parts of wool were treated as described in Example 19b to form a monothiocarbonated-monothiocarbamated wool. The resultant monothiocarbonated-monothiocarbamated wool was washed well with about 300 parts of water then treated with 100 parts of 0.06 M ferrous ammonium sulfate solution. The ferrous wool monothiocarbamate-monothiocarbonate was washed with about 150 parts of water then uniformly dispersed in a solution consisting of 5.0 parts acrylic acid, 100 parts water and 2.5 parts of 30% hydrogen peroxide.

After remaining for 20 hours at room temperature, the copolymerized wool was removed from the polymerization medium and thoroughly washed with water. Upon drying, the product weighed 6.2 parts which constituted a 23% conversion of monomer to unextractable polymer.

*Examples 21b–24b.*—A number of five-part samples of wool fibers were monothiocarbonated-monothiocarbamated and then reacted in a manner similar to that described in Example 1b with the exception that other polymerizable monomers were substituted for the styrene/acrylonitrile mixture. These substitutions and the results obtained with each are tabulated below:

| Ex. | Monomer | Wt. of Monomer Used (gms.) | Percent Conversion of Monomer to Polymer on Substrate | Percent Non-Extractable Polymer |
|---|---|---|---|---|
| 21b | Methyl acrylate | 4.3 | 80 | 96 |
| 22b | Glycidyl acrylate | 5.0 | 73 | 96 |
| 23b | Methyl methacrylate. | 4.3 | 75 | 94 |
| 24b | Glycidyl methacrylate. | 5.0 | 70 | 92 |

*Examples 25b–29b.*—A number of five-part samples of mohair fibers were monothiocarbonated-monothiocarbamated in the matter described in Example 1b and then ferrated and reacted as in Example 20b with the exception that five-parts of various monomers with sufficient emulsifying agent to form a stable emulsion, if needed, were used in place of the acrylic acid. The data listed below illustrates the results of these reactions:

| Ex. | Monomer | Percent Conversion of Monomer to Polymer on Substrate | Percent Non-Extractable Polymer |
|---|---|---|---|
| 25b | n-Butyl acrylate | 77 | 91 |
| 26b | N,N-diethylaminoethyl acrylate | 70 | 100 |
| 27b | Methacrylic acid | 75 | 100 |
| 28b | Methacrylamide | 79 | 100 |
| 29b | Vinylidene chloride | 84 | 89 |

The practicality of the products arising from the practice of this invention is immediately evident. Woolen materials with new and improved properties, such as modified elastic and felting properties, improved dimensional stability and abrasion resistance greater and permanent fiber lubricity, and insect-resistant textiles are a few of the realizable advantages of this process. In all cases, novel coatings and/or deepseated impregnations of woolen materials can be achieved. A judicious choice of monomer or monomers copolymerized with keratin-containing materials allows for a variation of properties, such as water repellency in the case of a copolymer made from stearyl-methacrylate or some other fatty alcohol ester of acrylic or methacrylic acid, or improved water absorbency if the copolymer is dervied from acrylic or methacrylic acid. In addition, copolymers derived from acrylic or methacrylic acid are highly hemostatic.

Generally, all types of materials containing wool or other keratin-containing substances to the extent of from 2 to 100% may be treated according to the above methods. This includes such mixtures as wool with nylon, wool with polyesters, wool with polyacrylonitrile fibers, wool with polypropylene fibers and mixtures of wool with other inert materials.

The herein-described graft polymerization inventions can be defined as a process of producing a copolymer of ethylenically unsaturated compounds and thioated substrates as defined herein which comprises reacting a water insoluble thioated keratinaceous substrate, via peroxidic free-radical initiation, with at least one ethylenically unsaturated monomer, preferably wherein:

(a) The dithioate derivative is employed, or
(b) The monomer is uniformly distribtued in water, e.g., as a solution, an emulsion or as a mechanical dispersion, or
(c) The reaction media contains a wetting agent, or
(d) The thioate derivative is an alkali-metal salt, e.g., the sodium salt, e.g., wherein the alkali metal salt of the thiocarbonate is derived from a soluble alkali metal silicate, or from a water-soluble alkali metal aluminate, or the alkali metal salt of the thioate is first converted to free acid before the polymerization is initiated.

Included in the above-defined inventions are the copolymers obtained by any of the above-described processes wherein the thioated substrate is a derivative of a keratin-containing material, preferably wool, especially any of the above products which is a copolymer with acrylamide, acrylonitrile, acrylic acid, styrene, isoprene or butadiene or a mixture of monomers comprising one or more of the above monomers.

(e) The thioate derivative is a salt of at least one metal selected from the group consisting of metals in the Periodic Table's Groups Ib, IIa, IIb, IIIa, IIIb, IVb, Vb, VIIb, VIII, Ge, Sn, Pb, and Bi; or (f) The thioate derivative is a salt of at least one member of the group consisting of ammonia, primary, secondary, tertiary amine, quaternary ammonium, tertiary sulfonium, quaternary phosphonium, quaternary arsonium and quaternary stibonium salt, e.g., a salt is formed from a trimethylsulfonium precursor or the salt is tetrakis (hydroxymethyl) phosphonium; included in the above described inventions are the products obtained by the process defined by (f); or (g) The monomer is selected from the group consisting of $CHR=CHR$; $H_2C=CR_2$; $R_2C=CR_2$ and

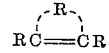

wherein R is selected from at least one member of the group consisting of (1) hydrogen; (2) alkyl group; (3) alkene group; (4) alkyne group; (5) aryl group; (6) substituted aryl group; (7) an electronegative group; (8) an alicyclic group; (9) a heterocyclic group; (10) a substituted heterocyclic group; (11) a carbalkoxy group of the general formula

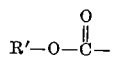

wherein R' is selected from the group consisting of hydrogen, R, hydrocarbons of from 1 to 18 carbon atoms, and substituted hydrocarbons of from 1 to 18 carbon atoms; (12) groups of the general formula

(13) groups of the general formula

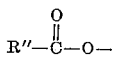

(14) groups of the general formula R″—O—; (15) groups of the general formula

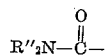

wherein R″ is selected from at least one member of the group consisting of hydrogen, R, and R', hydrocarbons of from 1 to 18 carbon atoms, substituted hydrocarbons of from 1 to 18 carbon atoms, and aliphatic groups of from 1 to 18 carbon atoms, especially wherein the thioate derivative is the dithioate derivative; or (h) The thioate derivative is a salt selected from at least one member of the group consisting of ammonia, primary, secondary, tertiary amine, quaternary organic ammonium, tertiary sulfonium, quaternary phosphonium, quaternary arsonium, quaternary stibonium, lithium, sodium and potassium, or a water-soluble salt of at least one metal selected from the group consisting of metals in the Periodic Table's Groups Ib, IIa, IIb, IIIa, IIIb, IVb, Vb, VIb, VIIb, VIII, Ge, Sn, Pb and Bi, which is reacted with the monomer dispersed in an aqueous solution, especially wherein the monomer is acrylamide, acrylic acid, acrylonitrile, a mixture of styrene and 2-ethylhexylacrylate or a mixture of acrylonitrile and styrene, especially wherein the thioate salt is a dithioate salt and more preferably wherein the dithioate salt is selected from at least one member of the group consisting of an alkali metal, ammonia and water-soluble amines, or is a ferrous, or ferric salt; included in the invention are the products obtained according to the process defined in (h), especially the products wherein the salt is ferrous, sodium or ammonium; or (i) The thioate derivative is mixed with the monomer in an aqueous solution in which the monomer is uniformly distributed, the peroxidic free-radical initiator is added to the solution containing the thioate salt derivative and the monomer, the reaction is allowed to proceed at a temperature of from 0° to 100° C. of from about 3 minutes to about 96 hours, and the formed copolymer is thereafter recovered from the solution; or (j) The thioate derivative is produced by reacting the corresponding water-insoluble keratinic substrate, which is wet with an aqueous solution of a base, with carbon disulfide or carbonyl sulfide, especially carbon disulfide; the base preferably being a metal base, more preferably an alkali-metal hydroxide and especially sodium hydroxide; desirably by the steps of wetting the polymeric material with an aqueous solution of the selected base, separating the solution from the polymer wet with base, and exposing the polymer wet with base to the vapors of carbon disulfide or carbonyl sulfide or a solution thereof in an inert solvent; desirably also performing the last of the aforesaid steps substantially immediately after wetting the keratinic substrate with the base; and desirably also thereafter washing the resulting copolymer with water to remove any excess monomer and soluble by-products of the reaction; plus all possible combinations of the above.

What is claimed is:

1. The process of producing a graft copolymer of ethylenically unsaturated monomers and derivatives of keratin-containing material which comprises the steps of preparing the thioated keratinaceous polymer by the steps of wetting a water-insoluble keratin-containing material with an alkaline solution; bringing the alkaline-wet material in intimate contact with carbon disulfide or carbonyl sulfide to produce the thioate derivative of the keratin-containing material; washing the resulting thioated substrate to remove the water-soluble by-products of the thioate formation or thioate substrate decomposition; and reacting the washed thioated substrate, via peroxidic free radical initiation, with at least one ethylenically unsaturated monomer.

2. The products obtained according to the process of claim 1.

3. The process according to claim 1 wherein the thioated keratinaceous polymer is thioated wool.

4. The process according to claim 1 wherein carbon disulfide is employed.

5. The process according to claim 1 wherein the alkaline solution is an alkali-metal hydroxide solution.

6. The process according to claim 1 wherein wool is wet with aqueous sodium hydroxide of up to 0.5 molar concentration and the alkaline-wet wool is contacted with carbon disulfide.

7. The process according to claim 1 wherein the graft polymerization is conducted in an aqueous polymerization system in which the monomer is uniformly distributed.

8. The process according to claim 7 wherein carbon disulfide is employed and the keratinaceous polymer is wool.

9. The process according to claim 7 wherein the peroxidic initiator is hydrogen peroxide.

10. The process according to claim 7 wherein the reaction is conducted in water.

11. The process according to claim 10 wherein the reaction is conducted in the presence of at least one member of the group consisting of an emulsifying agent sufficient to form a stable emulsion and a wetting agent.

12. The process according to claim 1 wherein the thioated keratinaceous polymer is a salt of at least one member of the group selected from ammonium, primary, secondary, tertiary amine, quaternary ammonium, tertiary sulfonium, quaternary phosphonium, quaternary arsonium, quaternary stibonium, lithium, sodium, potassium, Ge, Sn, Pb, Bi and metals in the Periodic Table's Groups Ib, IIa, IIb, IIIa, IIIb, IVb, Vb, VIb, VIIb and VIII.

13. The process according to claim 12 wherein carbon disulfide is employed and the keratinaceous polymer is wool.

14. The process according to claim 12 wherein the salt is an ammonium salt.

15. The process according to claim 12 wherein the salt is an aluminum salt.

16. The process according to claim 12 wherein the salt is the sodium salt.

17. The process according to claim 12 wherein the salt is the ferrous salt.

18. The process according to claim 1 which includes the step of converting a salt of the thioated keratinaceous polymer metathetically to another salt thereof.

19. The process according to claim 18 wherein the salt converted metathetically to another salt is the sodium salt.

20. The process according to claim 18 wherein the metathetically produced salt is the salt of a metal selected from the group consisting of Ge, Sn, Pb, and Bi and metals in the Periodic Table's Groups Ib, IIa, IIb, IIIa, IIIb, IVb, Vb, VIb, VIIb, VIII.

21. The process according to claim 17 wherein the metathetically produced salt is the aluminum salt.

22. Process according to claim 18 wherein the thioated keratinaceous polymer is a thioate salt produced by reacting metathetically a thioate salt of at least one member of the group consisting of ammonia, primary, secondary, tertiary amine, quaternary ammonium, tertiary sulfonium, quaternary phosphonium, quaternary arsonium, quaternary stibonium, lithium, sodium and potassium with a water-soluble salt of at least one metal selected from the group consisting of Ge, Sn, Pb and Bi and metals in the Periodic Table's Groups Ib, IIa, IIb, IIIa, IIIb, IVb, Vb, VIb, VIIb, VIII.

23. The process according to claim 22 wherein carbon disulfide is employed and the keratinaceous polymer is wool.

24. Process according to claim 1 wherein the monomer has an ethylenic group at an unsubstituted terminal carbon atom.

25. The process according to claim 24 wherein carbon disulfide is employed and the keratinaceous polymer is wool.

26. The process according to claim 1 wherein the monomer is at least one member of the group consisting of $CHR=CHR$; $H_2C=CR_2$ and $R_2C=CR_2$ wherein R is selected from at least one member of the group consisting of (1) hydrogen; (2) alkyl group; (3) alkene group; (4) alkyne group; (5) an aryl group; (6) an alicyclic group; (7) a heterocyclic group (8) a carbalkoxy group of the general formula

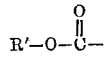

(9) groups of the general formula

(10) groups of the general formula

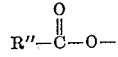

(11) groups of the general formula $R''—O—$; and (12) groups of the general formula

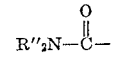

wherein R' and R'' are selected from a member of the group consisting of hydrogen and hydrocarbons of from 1 to 18 carbon atoms.

27. The process according to claim 26 wherein carbon disulfide is employed and the keratinaceous polymer is wool.

28. The process according to claim 26 wherein the monomer is acrylic acid.

29. The process according to claim 26 wherein the monomer is acrylonitrile.

30. The process according to claim 26 wherein the monomers are acrylonitrile and styrene.

31. The process according to claim 26 wherein the monomers are ethyl and butyl acrylates.

32. The process according to claim 26 wherein the monomer is vinylidene chloride.

33. Process according to claim 26 wherein the monomer is acrylamide.

No references cited.

WILLIAM H. SHORT, *Primary Examiner.*

E. M. WOODBERRY, *Assistant Examiner.*